3,002,028
STABLE SOLVENT COMPOSITION

Albert J. Haefner and Leslie L. Sims, Baton Rouge, La., assignors to Ethyl Corporation, New York, N.Y., a corporation of Delaware
No Drawing. Filed Oct. 27, 1958, Ser. No. 769,547
3 Claims. (Cl. 260—652.5)

This invention relates to chlorinated solvents, and particularly to a new and highly effective stabilized solvent composition particularly suitable for degreasing aluminum and other metal parts.

Chlorinated aliphatic hydrocarbons are used as solvents for the degreasing of metals, for dry cleaning and for many other purposes. Such solvents are useful in the degreasing of metals because of their low flammability and high solvency for oils and greases. Unfortunately, however, chlorinated aliphatic hydrocarbons in general attack and cause corrosion of metallic surfaces when they come into contact therewith. Such attacks, which also decompose the chlorinated aliphatic hydrocarbon, occur with surprising rapidity, especially at elevated temperatures.

Methyl chloroform, or 1,1,1-trichloroethane, is known to have exceptionally good solvency powers, particularly for metal cleaning operations. Further, this material is much less toxic than other chlorinated solvents. Very unfortunately, however, this particular solvent also exhibits an aggravated tendency to decompose and concurrently attack metals, both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. Accordingly, a significant need exists for a stable methyl chloroform composition, particularly a composition suitable for elevated temperature treatment of aluminum or similar easily corroded metals.

It is accordingly the object of this invention to provide a stabilized composition which is highly effective for the liquid degreasing of aluminum and other metals. A particular object is to provide a 1,1,1-trichloroethane solvent system which retains chemical passivity during repeated cycles of exposure to metals at processing conditions, and against the degradation influences of moisture, temperature, metal halides, and light. Other objects will appear hereinafter.

The present invention is a solvent composition comprising 1,1,1-trichloroethane and minor and stabilizing amounts of a glycol diester type compound dissolved therein. Such compounds are represented by the following general structural formula:

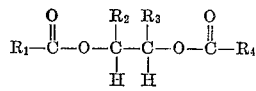

wherein $R_1$, $R_2$, $R_3$ and $R_4$ are the same or different and are selected from a group consisting of hydrogen and aliphatic and aromatic hydrocarbon radicals having up to 10 carbon atoms.

Such compounds include ethylene diacetate, ethylene dipropionate, ethylene acetate propionate, etc. The diacetate of 1,2-butanediol, dipropionate of 3,4-hexanediol, diacetate of 1-phenyl-1,2-propanediol, etc.

A highly preferred composition of the above type is 1,1,1-trichloroethane and minor and stabilizing amounts of ethylene diformate dissolved therein. It is found that very low concentrations of ethylene diformate, suitably 0.5 to 10 weight percent, added to the 1,1,1-trichloroethane solvent forms highly effective systems which resist deteriorating influences such as contact with aluminum metal, light, and elevated temperature. A preferred concentration range is from about 2 to 5 weight percent ethylene diformate in 1,1,1-trichloroethane.

As stated heretofore, it has also been found that certain derivatives and analogous compounds of ethylene diformate also form similar stable systems with 1,1,1-trichloroethane. For example, ethylene diacetate, ethylene dipropionate, ethylene acetate propionate, etc.

In general it has been found satisfactory to add quantities of from about 2 to 6 weight percent of the above type compounds to 1,1,1-trichloroethane. The amount may be increased to about 12 weight percent and at least proportionately greater stability obtained.

As indicated above, stabilized compositions of the present invention show little or no tendency to attack metals even at boiling conditions. The stabilized liquid can be stored for considerable periods of time, usually for months, in contact with aluminum and various metals, or alloys thereof, without significant decomposition.

The following examples demonstrate the effectiveness of stabilized 1,1,1-trichloroethane solvent even under the rigorous condition employed in some of the examples below. The chloride of aluminum and iron used in the following examples particularly demonstrate the benefits derived from the invention since reaction of these with 1,1,1-trichloroethane would be far more rapid than with metallic strips of these metals. These salts also provide a catalyzing influence which increases the ordinary rate of decomposition of 1,1,1-trichloroethane in contact with metals.

The example immediately following demonstrates the efficiency of a solvent system comprising 1,1,1-trichloroethane and a small amount of ethylene diformate. The solvent, employed entirely in the liquid phase, is exposed therein to the deteriorating influence of both hydrochloric acid and metal halides, as well as the presence of aluminum, or in other words to extremely vigorous conditions.

Example I

Ten milliliters of 1,1,1-trichloroethane and 0.2 milliliter of ethylene diformate, forming a 4.5 percent by weight concentration, were added to a glass flask. Next, 1 milliliter of a 0.0023 molar solution of hydrogen chloride in 1,1,1-trichloroethane and 0.05 gram of aluminum chloride was added to the flask. Strips of polished aluminum, iron and copper metals were then immersed in the solvent. The temperature of the solvent was then raised to 74° C. and the contents of the flask subjected to diffused light. These conditions were maintained for a period of 14 days. At the end of this time the contents of the flask were titrated against standardized sodium hydroxide. No hydrochloric acid had been formed. There was not the slightest decomposition of the 1,1,1-trichloroethane. The weight of the strips of metal did not change from their original weight. They were not attacked.

The following example demonstrates the benefits of the invention wherein an even lesser amount of ethylene diformate was used to stabilize the 1,1,1-trichloroethane.

Example II

This example is the same as the foregoing example in all respects except that a 1.8 percent by weight concentration of ethylene diformate in 1,1,1-trichloroethane solvent was formed within the glass flask. At the end of 6 days there was again no decomposition of the 1,1,1-trichloroethane. The strips of aluminum, iron and copper metal were again unattacked. This was evidenced in the same manner as in the foregoing example.

In order to contrast the benefits derived from the use of stable 1,1,1-trichloroethane, the following example illustrates results obtained when pure 1,1,1-trichloroethane alone was used as a solvent.

Example III

A strip of polished aluminum metal was immersed in 25 milliliters of pure, dry 1,1,1-trichloroethane within a glass flask. The contents of the flask were maintained at room temperature, approximately 25° C. Within 3 minutes a visible bubbling reaction began with discoloration of the 1,1,1-trichloroethane and deposition of carbonaceous material. At the end of 25 minutes the aluminum strip was withdrawn from the 1,1,1-trichloroethane solvent which was now opaque. The aluminum strip was badly corroded and portions thereof had been eaten away.

The following example shows the adverse effects of unstabilized 1,1,1-trichloroethane upon iron and copper metals.

Example IV

The foregoing example was repeated in all details except that the aluminum strip was omitted and strips of iron and copper substituted therefor. Attack upon the copper and iron strips was slower than upon the aluminum as described in the foregoing example. However, both the iron and copper were severely corroded after 12 hours.

The following example shows the deleterious results occurring when minor amounts of ferric chloride act on pure 1,1,1-trichloroethane.

Example V

The foregoing example was repeated except that instead of introducing a strip of aluminum metal into the 1,1,1-trichloroethane, 0.02 gram of ferric chloride was added to the flask. Upon introduction of the ferric chloride a reaction begain. Within a matter of 45 minutes the contents of the glass flask was a charred black gummy mixture.

From the foregoing, it is seen that even minor quantities of ferric salts in themselves will cause rapid deterioration of 1,1,1-trichloroethane. The following example shows the effects of unstabilized 1,1,1-trichloroethane on aluminum chloride.

Example VI

The foregoing example was repeated in all details except here a 0.05 gram portion of aluminum chloride was added instead of ferric chloride. The reaction was very rapid. In only a few minutes the contents of the flask was a charred black gummy mixture.

The following example demonstrates the efficiency of 1,1,1-trichloroethane stabilized with a small amount of of ethylene diacetate.

Example VII

This example is the same as Example I except that a 1.8 percent by weight concentration of ethylene diacetate was added to the glass flask. At the end of 5 days there was no decomposition of the 1,1,1-trichloroethane solvent. The strip of aluminum metal had not been attacked. This was evidenced by the same determinations as in Examples 1 and 2.

The following example demonstrates the benefits of the invention when a small amount of the diacetate of 1-phenyl-1,2-propanediol is used to stabilize 1,1,1-trichloroethane.

Example VIII

This example is the same as the foregoing example except that a 2 percent by weight concentration of the diacetate of 1-phenyl-1,2-propanediol is placed within the glass flask. Again, as in the foregoing example there was no decomposition of the 1,1,1-trichloroethane and the strip of aluminum metal was unattacked.

It will appear obvious from the foregoing description and examples that some modifications of the invention can be made without departing from the spirit and scope thereof. The word "metal" as used throughout the specification includes at least aluminum, iron and copper. By an "inhibiting amount" of a compound is meant a quantity thereof which is sufficient to stabilize the 1,1,1-trichloroethane. Preferred concentrations have been given throughout the specification. It will be understood that a certain minimum amount is necessary to effect the desired stabilization of the 1,1,1-trichloroethane but that amounts higher than the preferred concentrations given can be employed beneficially.

Having described the invention, what is claimed is:

1. A stabilized composition for degreasing aluminum and other metals comprising 1,1,1-trichloroethane having dissolved therein a glycol diester compound having the formula

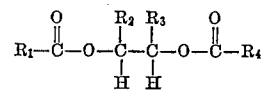

wherein $R_1$, $R_2$, $R_3$, and $R_4$ are selected from a group consisting of hydrogen, and aliphatic and aromatic hydrocarbon radicals having up to 10 carbon atoms, said glycol diester compound being present at a concentration of from about 0.5 to about 10 weight percent.

2. The composition of claim 1 wherein the glycol diester compound is ethylene diformate.

3. The composition of claim 1 wherein the glycol diester compound is ethylene diacetate.

References Cited in the file of this patent

UNITED STATES PATENTS

| | | |
|---|---|---|
| 2,022,168 | Brallier | May 21, 1935 |
| 2,371,647 | Petering et al. | Mar. 20, 1945 |
| 2,818,446 | Starks | Dec. 31, 1957 |
| 2,887,516 | Ferri et al. | May 19, 1959 |